United States Patent
Rajimwale et al.

(10) Patent No.: US 11,288,132 B1
(45) Date of Patent: Mar. 29, 2022

(54) DISTRIBUTING MULTIPLE PHASES OF DEDUPLICATION PROCESSING AMONGST A SET OF NODES WITHIN A CLUSTERED STORAGE ENVIRONMENT

(71) Applicant: EMC IP Holding Company LLC, Hopkinton, MA (US)

(72) Inventors: Abhishek Rajimwale, San Jose, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/588,782

(22) Filed: Sep. 30, 2019

(51) Int. Cl.
  *G06F 11/14* (2006.01)
  *G06F 9/50* (2006.01)
  *G06F 11/07* (2006.01)

(52) U.S. Cl.
  CPC ........ *G06F 11/1464* (2013.01); *G06F 9/5083* (2013.01); *G06F 11/0709* (2013.01); *G06F 11/1453* (2013.01); *G06F 11/1469* (2013.01)

(58) Field of Classification Search
  None
  See application file for complete search history.

(56) References Cited

U.S. PATENT DOCUMENTS

| | | | |
|---|---|---|---|
| 2012/0005171 A1* | 1/2012 | Anglin | G06F 16/215 707/692 |
| 2015/0324236 A1* | 11/2015 | Gopalan | G06F 9/5088 711/162 |

* cited by examiner

*Primary Examiner* — Michael Alsip
(74) *Attorney, Agent, or Firm* — Dergosits & Noah LLP; Todd A. Noah (57) ABSTRACT

Described is a system for distributing multiple phases of a deduplication processing amongst of set of nodes. The system may perform a load-balancing in configurations where multiple generations of backup data are redirected to the same host node, and thus, require the host node to perform certain storage processes such as writing new backup data to its associated physical storage. Accordingly, the system may perform an initial (or first phase) processing on a first node that is selected based on resource usage or classification (e.g. metadata storing node). The system may then perform a subsequent (or second phase) processing on a second, or host node, that is selected based on the node already storing previous generations of the backup data. Accordingly, the system still redirects processing to a host node, but provides the ability to delegate certain deduplication operations to additional nodes.

20 Claims, 8 Drawing Sheets

DISTRIBUTING MULTIPLE PHASES OF DEDUPLICATION PROCESSING AMONGST A SET OF NODES WITHIN A CLUSTERED STORAGE ENVIRONMENT

TECHNICAL FIELD

This disclosure relates to managing deduplicated backup data, and more particularly, distributing phases of deduplication processing amongst of set of nodes within a clustered storage environment.

BACKGROUND

Clustered storage systems employ various techniques for distributing data across a set of nodes of a cluster. For example, incoming data may be divided into chunks that are distributed across the set of nodes. To balance the load across the cluster, systems employ various distribution methods such as round-robin techniques or weighted algorithms. However, when distributing data within a system that employs data deduplication, such methods are often less efficient because related data may be grouped together on a particular node. Accordingly, distribution is often merely directed to a host node that stores such related data. Moreover, client-side components that may perform certain preliminary processing on the chunks of data are not always available to clients. Accordingly, there is a continued need to efficiently manage load balancing of deduplicated data within a clustered storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for distributing multiple phases of a deduplication processing amongst of set of nodes within a clustered storage environment. By performing a deduplication process in multiple phases, the system may perform a load-balancing amongst nodes even in configurations where multiple generations of backup data are redirected to the same node. For example, in a configuration where related data (e.g. previous generations of the backup data) is stored on the same host node, it may be most efficient that the host node perform certain processes such as writing new backup data to its associated physical storage. However, in order improve load balancing while still incorporating the host node, the system may perform a deduplication processing in multiple phases. For example, the system may perform an initial (or first phase) processing on a first node that is selected based on resource usage or other factors such as the first node already storing particular information (e.g. metadata) required to perform certain deduplication operations. The system may then perform a subsequent (or second phase) processing on a second, or host node, that is selected based on the node already storing (or hosting) the related data. Accordingly, the system may redirect processing to a host node, but still provide the ability to delegate certain operations to additional nodes. Thus, such a configuration potentially improves deduplication load balancing amongst nodes without unduly affecting network traffic within a cluster.

In addition, the system may also provide a benefit of improving efficiency in instances where a client-side backup application or plug-in that is delegated to perform certain processing is not available to the client system from which the backup data originates. For example, such client-side processing delegation may only be possible when a client system implements certain protocols (e.g. an OST protocol). However, when using certain other protocols (e.g. NFS and CIFS), the client system may not be able to implement a client-side backup application or plug-in (e.g. Dell EMC DD Boost application/plug-in). Accordingly, the system described in some embodiments herein, may provide a universal system that provides improved performance by delegating operations to nodes of the clustered storage environment. For example, in some embodiments, the initial processing phase may correspond to "front-end" deduplication processing and the subsequent or second phase may correspond to "back-end" deduplication processing. Accordingly, the system may achieve meaningful (if not significant) efficiency improvements even without client-side processing delegation.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Data Domain data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
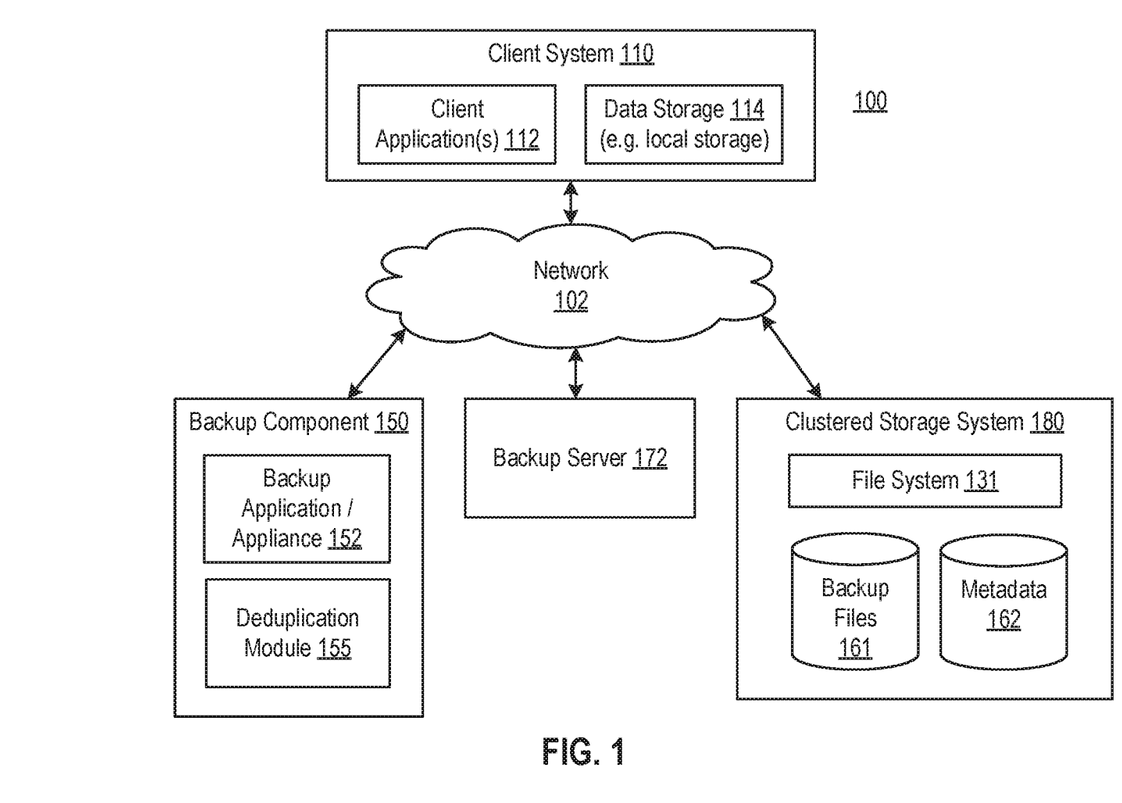
FIG. 1 is a block diagram illustrating an example operating environment for distributing phases of deduplication processing within a clustered storage environment according to one or more embodiments of the disclosure.

More specifically, and with reference to FIG. 1, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
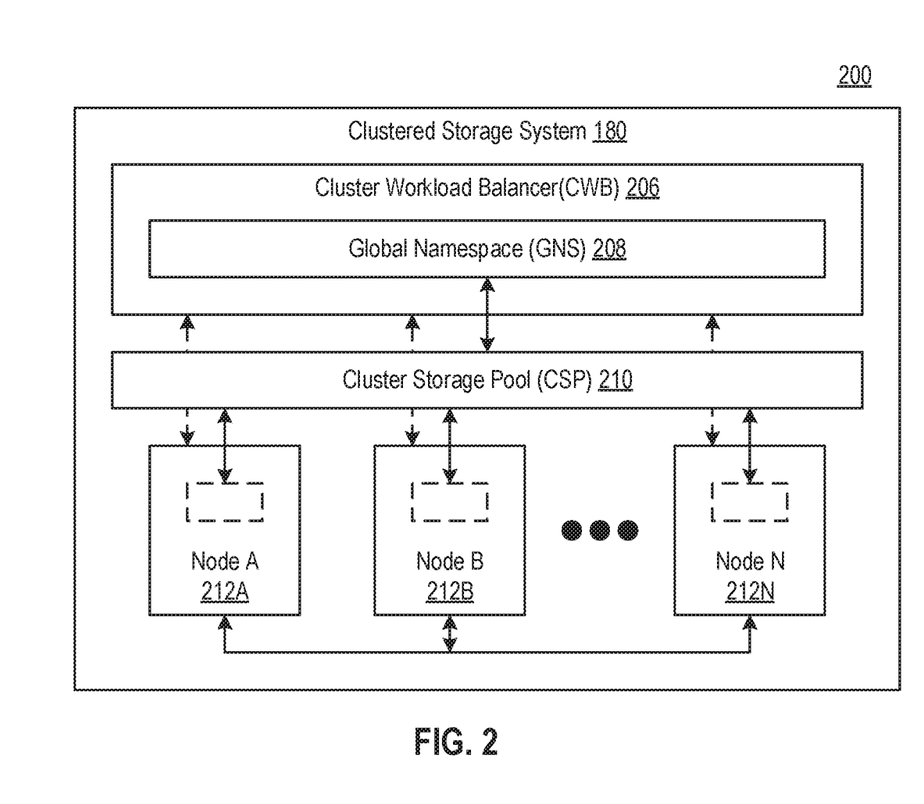
FIG. 2 is a block diagram illustrating an example clustered storage system according to one or more embodiments of the disclosure.

FIG. 2 is a block diagram 200 illustrating an example clustered storage system according to one or more embodiments of the disclosure.

The clustered storage system 180 may represent a deduplicated cluster storage system (or service), distributed storage system (or service), distributed file system (or service), etc. As shown, the clustered storage system 180 may include, or represent, a group of linked nodes (or storage nodes) 212A-N, which may be configured to share resources. The shared resources may include computing resources (e.g. computer processors and memory), storage resources (e.g. persistent data storage), and network resources (e.g. traffic bandwidth). Further, the sharing of any resource may entail virtualizing the resource in each node to create a logical pool of that resource that spans, and is made available to all nodes (e.g. nodes 212A-N), across the clustered storage system 180. For example, when considering storage resources, the physical device (e.g. HDDs, SSDs, etc.) representative of the local storage resources on each node may be virtualized to form a globally-accessible cluster storage pool (CPS) 210. Accordingly, the CPS 210 may represent a logical pool of disk capacity formed from all storage resources across the clustered storage system 180.

In some embodiments, a node 212 may represent a physical computing system dedicated to storing backup files, processing workloads, and other operations. For example, processing workloads may include processing service requests submitted to the clustered storage system 180 such as receiving file operation requests delegated from the cluster workload balancer (CWB) 206, processing the file operation requests (e.g. deduplication operations as further described herein), and returning file operation responses back to the CWB 206 based on results obtained from processing the file operation requests. It should be noted that a node 212 may perform other functionalities without departing embodiments of the disclosure.

In some embodiments, the clustered storage system 180 may include a cluster workload balancer (CWB) 206. The CWB 206 may represent a physical computing system dedicated to distributing service traffic across the various nodes of the clustered storage system 180. This distribution of service traffic (also referred as load balancing) may reduce individual node (212A-N) workload, may prevent any one node from becoming a single point of failure, and may improve the responsiveness and availability of the deduplicated storage service provided by the clustered storage system 180. To the extent of load balancing, the CWB 206 may include the following functionalities: monitoring and tracking resource availability, for any given point in time, across the various nodes, receiving file operation requests from the upstream components (e.g. backup component 150, backup server 172, etc.); selecting the best available nodes to process the file operation requests based on the tracked resource availability; delegating the file operation requests to the best available nodes for processing; receiving file operation responses from the best available nodes; and forwarding the file operation responses to the requesting components.

In some embodiments, the CWB 206 may also represent a single point of contact, for the clustered storage system 180, with which components (e.g. of environment 100) may interface. In some embodiments, the clustered storage system 180 may maintain a global namespace (GNS) 108, which may be managed by the CWB 206. The GNS 208 may refer to an abstraction that unifies the various local filesystems, maintained by the various nodes (212A-N) across the clustered storage system 180, into a single virtualized global filesystem. The single virtualized global filesystem may subsequently be presented to the components in order to simplify the management and accessibility of storage and/or data across the clustered storage system 180, which may be aggregated in the form of the CPS 210.

Figure 3:
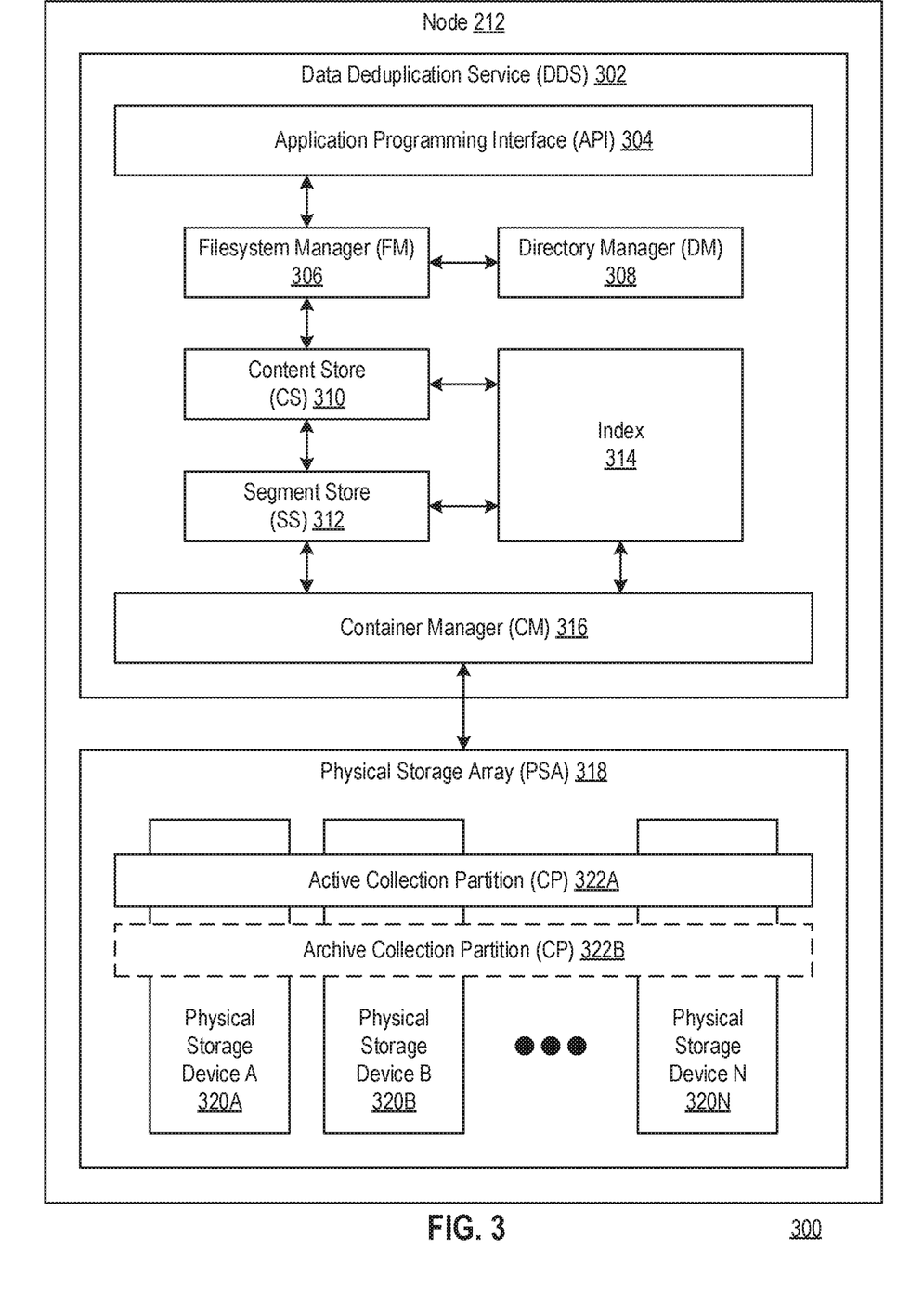
FIG. 3 is a block diagram illustrating an example storage node according to one or more embodiments of the disclosure.

FIG. 3 is a block diagram 300 illustrating an example storage node according to one or more embodiments of the disclosure. As shown a node 212 may include a data deduplication service (DDS) 302 operatively connected to a physical storage array (PSA) 318.

In some embodiments, the DDS 302 may represent a component that may be responsible for consolidating and/or retrieving data (e.g. backup files from the PSA 318). In some embodiments, the DDS 302 may perform such responsibilities while performing data deduplication. In some embodiments, the DDS 302 may include an application programming interface (API) 304, a filesystem manager (FM) 306, a directory manager (DM) 308, and a content store (CS) 310, a segment store (SS) 312, an index 314, and a container manager (CM) 316. Each of these DDS 302 subcomponents is described below.

The API 304 may represent an interface through which external entities such as the cluster workload balancer (CWB) 206 and other nodes 212 in a cluster may interact with the DDS 302. Accordingly, the API 304 may employ a set of subroutine definitions, protocols, and/or tools directed to enabling communications between the DDS 302 and the external entities. For example, the API 304 may performing functionalities including: receiving file operation requests delegated from the CWB 206; extracting file operations and operation-pertinent arguments (OPA) from the file operation requests; invoking the FM 306 using the file operations and the OPA, to process the file operation requests; receive remote procedure calls (RPC) from the FM 306 for transmission to one or more specified other nodes; receive remote procedure reports (RPR) from other nodes in response to RPC transmitted beforehand; invoking the FM 306 using the RPR; receiving file operation responses from the FM 306; and transmitting the file operation responses, disclosing results (if any) concerning earlier delegated file operation requests, to the CWB. It should be noted that additional functionalities are also contemplated.

The FM 306 may represent a component responsible for the coordination of DDS 302 operations. To that extent, the FM 306 may include functionality to: receive file operations delegated to the node 212 for processing; invoke other DDS 302 subcomponents (e.g. the DM 308 and the CS 310) towards processing received file operations; issue remote procedure calls (RPC) to other (remote) nodes; and issue file operation reports based on results yielded from processing received file operations. In addition, the FM 306 may include functionality to maintain, lookup, and update a local redirection cache. In one embodiment, the FM 306 may include functionality to indicate which file segments (e.g. unique blocks or chunks of data) pertain to a file. These file segments may be identified as a list of fingerprints (or hashes) representative of the file segments.

The DM 308 may represent a component responsible for the management of files in one or more filesystems across the clustered storage system 180. To that extent, the DM 308 may include functionality to maintain, traverse, and update one or more namespace trees. For example, a namespace tree may represent a hierarchical data structure directed to reflecting the way files and/or directories may be identified and stored in data storage (e.g. the PSA 318).

The CS 310 may represent a component responsible for the management of file content associated with various files consolidated in the PSA 318. To that extent, the CS 310 may include functionality to maintain, traverse, and update various segment trees. For example, a segment tree may refer to a Merkel tree, or a hierarchical data structure, for identifying and tracking the locations of file segments, pertinent to a single file, stored in the physical storage devices (320A-N) of the PSA 318. If the PSA 318 is formed from one physical storage device (320A-N), the locations of the pertinent file segments may be indicated through disk offsets. Alternatively, if the PSA 318 is formed from multiple physical storage devices (320A-N), the locations of the pertinent file segments may be indicated through physical storage device (320A-ON) identifiers in addition to disk offsets. Furthermore, the CS 310 may also include functionality to, at least in part, execute data deduplication on the node 212 by deconstructing files into file segments (also referred to as blocks or chunks).

The SS 312 may represent a component responsible for assessing whether new file segments, yielded from the CS 310, may already be stored. Should new file segments be stored already, metadata for those new file segments, rather than the new file segments themselves, may be stored to optimize storage space utilization. In conjunction with the CS 310, the SS 312 may include functionality to execute data deduplication operations on the node 212.

The index 314 may represent a data structure that may be used to locate stored file segments within one or more physical storage devices (320A-N) of the node 212. More specifically, the index 314 may include associations that map fingerprints (or hashes) to storage locations that consolidate the file segments that which the fingerprints represent.

The CM 316 may represent a component responsible for the management and tracking of containers. A container may refer to a logical grouping of compression regions consolidated in a data storage (e.g. PSA 318). Each compression region, in turn, may encompass a compressed and/or archived data object that stores one or more file segments and their associated metadata within.

Returning to the node 212 components, in some embodiments, the PSA 318 may represent a collection of one or more physical storage devices (320A-N) on which various forms of information (e.g. backup files) may be stored and/or consolidated. Examples of a physical storage device (320A-N) may include, but are not limited to, a hard disk drive (HDD), a solid state drive (SSD), and network attached storage (NAS), etc. An active collection partition (CP) 322A may be implemented and span across at least a subset of the physical storage devices (320A-N) of the PSA 318. Accordingly, the active CP 322A may represent a logical storage pool wherein a collection of files stored therein dedupes only with other files in the logical storage pool. In some embodiments, an archive CP 322B may also be implemented and span across at least another subset of the physical storage devices (320A-N). In contrast to the active CP 322A, which may store frequently accessed and/or recently created files, the archive CP 322B may represent a logical storage pool wherein aged, seldom accessed files may reside and dedupe with other aged, seldom accessed files.

Figure 4:
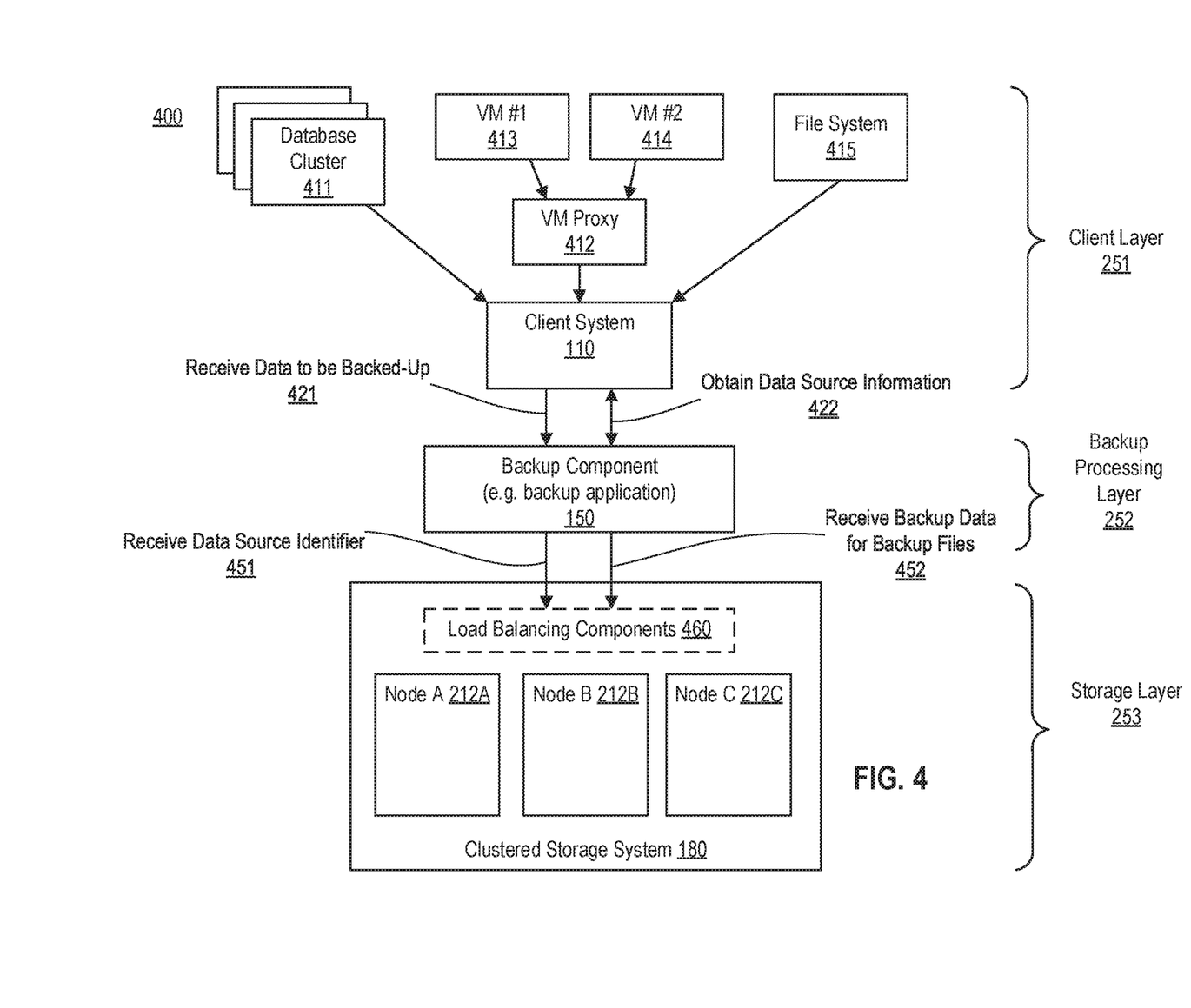
FIG. 4 is a block diagram illustrating an example interaction between components for distributing phases of deduplication processing amongst a set of nodes within a clustered storage system according to one or more embodiments of the disclosure.

FIG. 4 is a block diagram 400 illustrating an example interaction between components for distributing phases of deduplication processing amongst a set of nodes within a clustered storage system according to one or more embodiments of the disclosure.

As shown, a client system (or client server) 110 may be associated with one or more data sources (e.g. data sources 411-415). The data sources may be part of, or work in conjunction with, the client system 110. For example, the data sources may be part of a separate server, or part of a cloud storage infrastructure. Accordingly, the client system 110 and the data sources may be part of a client layer 251 that provides data to be backed-up by a backup component (or backup application) 150 that is part of a backup processing layer 252. As shown, the client system 110 may provide (or transmit, send, transfer, forward, etc.) data to be backed-up (e.g. raw data) to the backup component 150 as part of a backup process. In some embodiments, data may be sent to the backup component 150 at various time points as part of a backup schedule (e.g. hourly, daily, etc.).

Accordingly, as shown in 421, the backup component 150 may receive data to be backed-up from the client system 110 and may process such data to initiate the creation of one or more backup files. In some embodiments, only the backup component 150 may be able to communicate with the client layer 251. For example, the backup component 150 may only be able to access a client system 110 that acts as a proxy (or intermediary) to obtain such data from the data sources. In response to receiving the data, as shown in 422, the backup component 150 may obtain data source information associated with the received data from the client system 110. The data source information may include any form of information that may be used (directly or indirectly) to create an identifier (or unique identifier) for a data source. For example, the data source identifier may include a device (or host) address (e.g. IP, network, or MAC address, etc.), an identifier (e.g. VM ID, database ID, storage ID, etc.), or other form of identifier (e.g. device name, customer ID, client ID, etc.). In some embodiments, a data source identifier may be generated. For example, a hash value may be generated from the data source information and be associated with a particular data source. For example, an IP address of a data server may be used to generate a unique hash value associated with the data server.

In some embodiments, the data source identifier may identify a more granular (e.g. specific) data source than the more general client system 110 that may be associated with multiple data sources. For example, as shown, the data to be backed-up (e.g. application data, operating system data, database records or objects, etc.) may originate from more than one VM (e.g. VMs 413 and 414) via a VM Proxy 412, and therefore, the data source identifier may include the particular VM ID (e.g. VM ID for VMs 413 or 414) instead of the VM ID for VM Proxy 412. As another example, as shown Cluster Database 411 may include several databases (or databases instances), and accordingly, the data source identifier may be a database ID for a particular database or instance within the cluster.

In order to obtain such granular identifying information, the backup component 150 may leverage the ability to access components of the client system 110 in a manner unavailable to the storage layer 253. For example, the backup component 150 may be authorized to access (e.g. via an API) a particular client layer 251 component such as a particular data source, client system 110, client system application, etc., and act as an intermediary to transfer data source information to the clustered storage system 180. The backup component 150 may obtain the data source information as part of the backup process (e.g. the operation that transmits data to the backup component 150), or as a separately initiated operation. For example, the separately initiated operation may include directly accessing (e.g. querying) the client system 110, data sources 411-415, or associated component to obtain data source information. For instance, the backup component may query a VM proxy (e.g. VM proxy 412) of the client system 110 to obtain data source identification information of a particular VM ID of a VM (e.g. VMs 413 or 414) that is associated with data to be backed up.

In some embodiments, the client system 110 may provide (e.g. transmit, transfer, send, etc.) data to the backup component 150 via a protocol (e.g. backup, storage, or transfer protocol, etc.). Accordingly, in some embodiments, information included as part of a protocol may be used as a basis for the data source identifying information. For example, the backup component 150 may parse information included as part of the protocol transmission to obtain information such as data source information (e.g. particular database identifier) or destination (or target) of the data (e.g. particular backup component endpoint).

In some embodiments, the backup component 150 may provide data to the clustered storage system 180 by requesting the clustered storage system to write (or create) particular backup files. In some embodiments, the clustered storage system 180 may be responsible for performing deduplication processing. For example, target-side deduplication may be implemented instead of source-side (or client-side) deduplication. For instance, as described, nodes (e.g. nodes 212A-C) may host a component stack (e.g. software stack) that includes a file system with deduplication capabilities. Accordingly, the backup component 150 may transmit backup data to be stored by the clustered data storage system 180 along with the data source identifiers.

As shown, the clustered storage system 180 may include the storage nodes 212 (e.g. storage nodes 212A-C), and related components that may form a storage layer 253. In some embodiments, related data (e.g. subsequent data backups) may be group to a particular node or a particular deduplication domain. For example, a deduplication domain may include a particular storage node, a partition within a particular node, or a storage partition associated with one or more storages nodes (e.g. a partition spanning multiple nodes). In some embodiments, a deduplication domain may correspond to one or more physical storage devices (e.g. physical storage device 320). The load balancing components 460 may work in conjunction with, or be a part of, nodes 212. For example, the load balancing components 460 may be part of a component stack (e.g. software stack) that may include one or more of the cluster workload balancer (CWB) 206, data deduplication service (DDS) 302, API 304, etc. In one embodiment, the load balancing components 460 may include an API or plug-in, that acts as a layer that the backup component 150 (e.g. via a backup application 152) may access to perform operations as described herein with components of the clustered storage system 180.

As described, the clustered storage system 180 (e.g. via the load balancing components 460) may implement a load balancing technique (or algorithm) to distribute the data processing. The data processing may include a deduplication processing (or operation, method, etc.) that is divided into multiple phases. For example, the load balancing components 460 may distribute one or more phases of the deduplication processing (or pipeline) amongst a set of nodes. Accordingly, the load balancing components 460 may monitor the resource utilization amongst the set of nodes. For example, the load balancing components 460 (e.g. CWB 206) may monitor the CPU utilization of the set of nodes to determine where to schedule an initial phase of the deduplication processing.

In some embodiments, the clustered storage system 180 may perform an initial (or first phase) processing on a first node (e.g. node 212A) that is selected based on resource usage (e.g. CPU utilization) or other factors such as the first node already storing particular information (e.g. metadata) required to perform certain deduplication operations. The clustered storage system 180 may then perform a subsequent (or second phase) processing on a second (e.g. node 212B), or host node, that is selected based on the node already storing (or hosting) the related data. Accordingly, the clustered storage system 180 may still redirect processing to a host node, but still delegate certain operations to additional nodes. In some embodiments, the deduplication processing of backup data may include a distributed segment processing (DSP). For example, DSP includes processing segments of the backup data such that a storage node may have a higher CPU utilization on a first backup, but subsequent backups should incur a lower CPU utilization due to requirement of processing less data over time. As part of a deduplication process, the clustered storage system 180 may perform writes and reads for deduplicated data objects, which may be stored as backup files. For example, the deduplication process may include several sub-processes (or operations, steps, etc.) such as anchoring, fingerprinting, mapping, compression, encryption (if necessary), filtering, packing, and writing (e.g. to a persistent storage).

For example, an anchoring operation may include variable-length segments in a content dependent manner. A fingerprinting operation may include generating a unique identifier for a segment of data (e.g. using a SHA hash). A mapping operation may include building a tree of segments that record a mapping between byte ranges and segment descriptor (e.g. fingerprint). A compression operation may include reducing the number of bits required to represent a data segment using any suitable algorithm (e.g. Ziv-Lempel or variation thereof). An encryption operation may include securing segments of data using any suitable encryption algorithm. A filtering operation may include an operation to determine whether a data segment is a duplication (e.g. a data segment already stored by the clustered storage system). In some embodiments, the filtering operation may performed prior to writing the backup data as a backup file. For example, the system may perform inline deduplication (e.g. data deduplication before writing data to a storage). Alternatively, in some embodiments, the system may perform post-processing deduplication (e.g. reduce data after writing to storage). A packing operation may include adding data segments to a data structure (e.g. container). In some embodiments, a compression operation may be part of a packing operation. A writing operation may include writing the data segments to a storage. For example, the writing operation may include writing the filtered data segments (e.g. deduplicated segments) to a physical storage associated with a particular node. In some embodiments, the writing operation may be part of the packing operation.

In some embodiments, the first (or initial) phase of deduplication processing may include one or more of the anchoring, fingerprinting, mapping, compression operations (or sub-processes). Accordingly, in such embodiments, the second (or subsequent) phase processing may include one or more of the filtering, packing, and writing operations (or sub-processes). As further described herein, the clustered storage system 180 may distribute a first phase processing workload on several factors or policies and distribute the second phase processing to a host node that already stores data related to the backup data file. For example, the host node may already store previous generations of the backup data.

As described, the clustered storage system 180 may distribute a second phase processing to a node that already stores data related to the backup data. In some embodiments, in order to identify such a host node, the system may leverage data source information to determine the backup data originates from the same source as data already stored by the host node. For example, the clustered storage system 180 may ensure (e.g. to an extent determined by a predefined distribution policy) that data originating from a particular granular data source is stored together on the same node of node. To provide such an ability, the backup component 150 may provide (e.g. transmit, send, transfer, inject, input, etc.) a data source identifier to the clustered data storage system 180. Accordingly, as shown 451, the clustered storage system 180 may receive the data source identifier. In some embodiments, the data source identifier may be in the form of a placement tag. This data source identifier (e.g. placement tag) may be received by the clustered storage system 180 along with the associated (or corresponding) portion of backup data as shown in 452. In some embodiments, the data source identifier may be received at the same time as the backup data (e.g. as part of the data, or as an input to an operation), or the data source identifier may be received separately or at a different time from when the backup data is received by the clustered storage system 180.

The clustered storage system 180 may receive the data source identifier in various ways. In some embodiments, the data source identifier may be received as an input to an operation that writes (or creates) a backup file to the clustered storage system 180. For example, the input may include the data source identifier as an argument to an operation (e.g. function, method, class, etc.) that initiates the creation of a backup file to the clustered storage system 180. In some embodiments, the backup component 150 may initiate creation of a backup file using an API provided by the clustered storage system 180. For example, the clustered storage system 180 (e.g. as part of DDS 302) may provide an API (e.g. API 304) to access a storage layer (or protocol) to which the data source identifier may be passed along with a portion of data to be used to create a backup file. Accordingly, in some embodiments, the data source identifier may be provided to the clustered storage system 180 at the time of a backup file write request. Accordingly, the file write may be performed by the clustered storage system 180 directly to a particular deduplication domain (e.g. storage node) via the backup component 150.

In some embodiments, the data source identifier may be received directly to a file system or namespace managed by the clustered storage system 180. For example, the backup component 150 may provide a data source identifier by setting (or specifying) the identifier as a file attribute. In another example, the backup component 150 may provide the data source identifier by specifying the identifier as part of metadata (e.g. metadata attribute, metadata file, index, database, etc.) associated with a backup file. Accordingly, the clustered storage system 180 may store the data source identifier as metadata. For example, the metadata may include some form of an index (e.g. index 314) that is managed, maintained, and/or referenced by the clustered storage system 180. In some embodiments, the index may be stored on a specialized node (e.g. index node) that may be referenced when performing file operations (e.g. reading/writing backup files). For example, the index node may include a separate (or independent) specialized node that is provided to primarily (or exclusively) store index information instead of backup data or files as with other nodes.

As described, the clustered storage system 180 may redirect a backup file to a particular destination to ensure that all backup files associated with a particular data protection set are stored within the same node. Accordingly, in some embodiments, a component can continue to perform file operations on a particular backup file because the clustered storage system 180 redirects such requests to a particular host node that is storing (or hosting) the particular backup file. Accordingly, such a configuration may maintain the deduplication efficiency using various deduplication schemes. For example, for virtual synthetic based workloads, storing backup files of a particular data protection set on the same node ensures that file operation requests incorporate extents from older backup files that can be serviced locally in the same node. With change block tracking (CBT) workloads, the clustered storage system 180 (e.g. via the file system) may ensure that a request to copy a previous backup file is redirected to the correct node storing the older backup file. Accordingly, the newly created (e.g. copied) backup file may incorporate the same data source identifier as the source backup file (e.g. older backup file). Thus, the backup application can continue to overwrite the blocks (or extents) that have changed since the previously created backup files onto the newly created backup files.

In some embodiments, the system may implement a particular distribution policy, or override a particular distribution policy, in certain circumstances. For example, if it is determined that a first backup file to be written does not have data from a same data source (e.g. same data protection set) already stored within a particular node, the system may perform a distribution based on a first distribution policy that disregards the data source identifier of the first backup file. For instance, the first distribution policy may perform a distribution solely based on a resource utilization (e.g. storage capacity, CPU usage, bandwidth, etc.). However, if it is determined that the first backup file to be written does in fact have data from the same data source already stored within a particular node, the system may perform the distribution based on a second distribution policy that accounts for the data source identifier of the first backup file. For instance, the second distribution policy may prioritize grouping related data (or override the first distribution policy) so that irrespective of resource utilization, the first backup file is written to the node that already stores backup files from the same data source. Accordingly, in some embodiments, the system may perform an override to ensure that data from a particular data source gets grouped together on the same deduplication domain.

Figure 5:
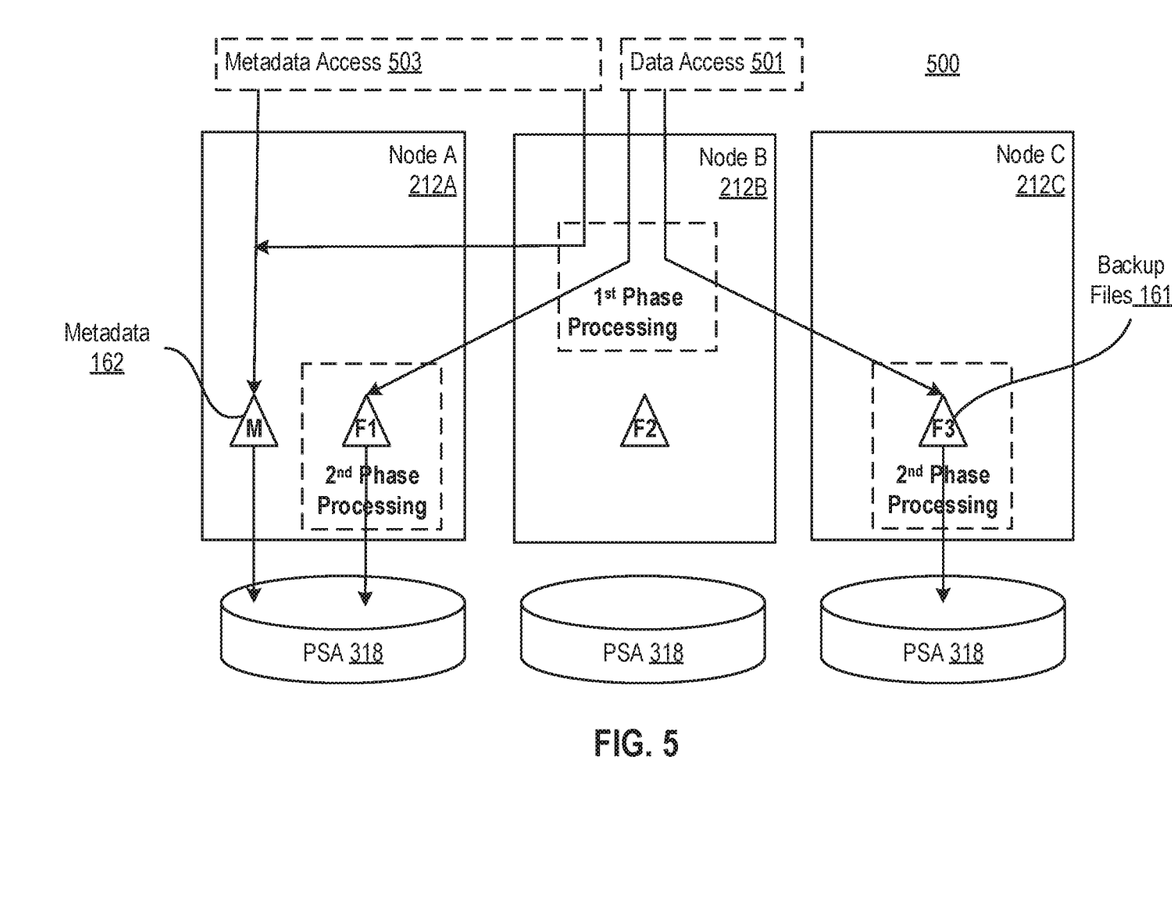
FIG. 5 is a block diagram illustrating an example of distributing a first phase of the deduplication processing based on a resource usage of the nodes within a clustered storage system according to one or more embodiments of the disclosure.

FIG. 5 is a block diagram 500 illustrating an example of distributing a first phase of the deduplication processing based on a resource usage of the nodes within a clustered storage system according to one or more embodiments of the disclosure. As shown in this example, three nodes (shown as Nodes 212A, 212B, and 212C) may each host (or store) backup files 161 (shown as backup files F1, F2, and F3). In addition, one or more of the nodes may store metadata 162 (shown as metadata M). In this example, Node A hosts backup file F1 as well as metadata M, Node B hosts backup file F2, and Node C hosts backup file F3. Accordingly, in response to a data access 501 (e.g. write backup data operation), the system may initiate a deduplication process. For example, the data access may request that backup data related to backup files F1 and F3 be written. As described, the system may determine based on a resource usage of each of the nodes, that Node B is available to perform a workload. For example, the system may determine that Node B currently has the most available CPU resources (or lowest current CPU utilization), and accordingly, initiates Node B to perform a first phase deduplication processing. Accordingly, as shown, Node B may perform the first phase deduplication processing for the backup data related to backup files F1 and F3. In addition, a metadata access 503 may be performed by the system, or Node B specifically, to obtain information from metadata M that is stored by Node A. For example, the metadata may include information determining whether the backup data is related to backup files (or objects) already stored by the nodes, and if so, which nodes store (or host) such backup files. After directing Node B to perform the first phase deduplication processing, the second phase deduplication processing may be directed (or redirected) to the appreciate node that hosts the related data. Accordingly, as shown in this example, Node A may perform a second phase processing of the backup data related to backup file F1, and similarly, Node C may perform a second phase processing of the backup data related to backup file F3. In other words, despite the backup data not including data related to backup file F2 that is hosted by Node B, Node B may still be delegated to perform some deduplication processing as part of a load balancing scheme. As described, the second phase processing performed by Node A and Node C for backup files F1 and F3 respectively, may include writing data (e.g. as a backup file or object) to an associated physical storage array 318. For example, writing data may include creating a second backup file (e.g. backup file F1' or F3'). In some instances, writing the second backup file (e.g. data segments) may include writing only the differences (e.g. different segments) between the first backup file (F1 and F3) and the second backup file (F1' or F3'), or performing an update indicating the backup data is a duplicate of the first backup file.

In addition to selecting a node based on resource utilization, in some embodiments, the system may select a node based on the node being a specialized node or the node storing particular data as further described with reference to FIG. 6.

Figure 6:
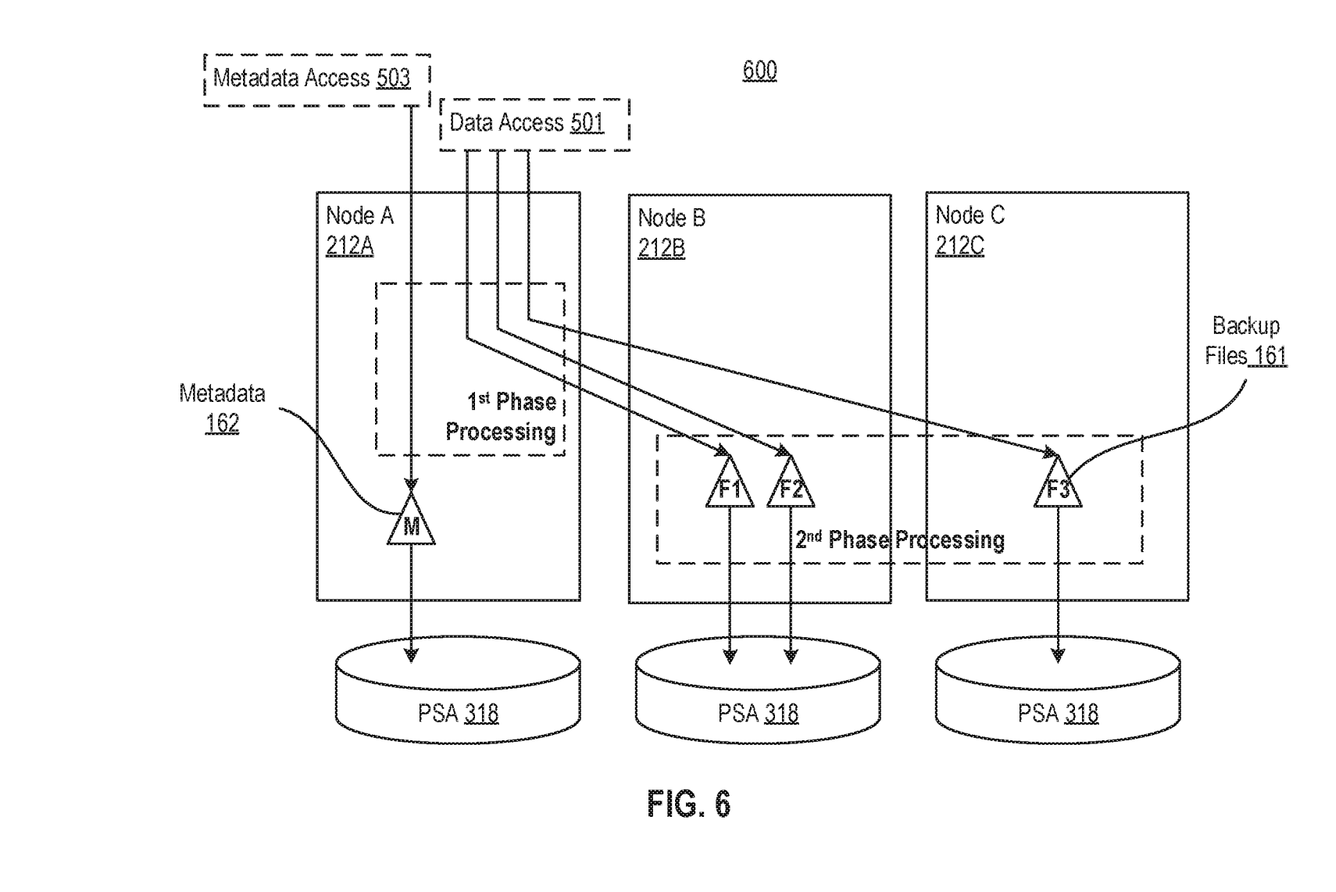
FIG. 6 is a block diagram illustrating an example of distributing a first phase of the deduplication processing based on identifying a metadata node within a clustered storage system according to one or more embodiments of the disclosure.

FIG. 6 is a block diagram 600 illustrating an example of distributing a first phase of the deduplication processing based on identifying a metadata node within a clustered storage system according to one or more embodiments of the disclosure. Similarly, in this example, three nodes (shown as Nodes 212A, 212B, and 212C) may host (or store) backup files 161 (shown as backup files F1, F2, and F3). In addition, one or more of the nodes may store metadata 162 (shown as metadata M). In this example, Node A hosts metadata M, Node B hosts backup files F1 and F2, and Node C hosts backup file F3. Thus, in some embodiments, Node A may be identified as a metadata node. For example, in some embodiments, the system may include a dedicated metadata node to ensure that file system metadata (e.g. stored as metadata M) is readily (or highly) available to components of the system. In addition, based on the configuration, a dedicated metadata node may have a greater availability of resources (e.g. CPU availability) as certain metadata related operations such as accessing file system information may not be as resource intensive as certain deduplication operations. For instance, metadata related operations such as retrieving (or fetching, obtaining, etc.) attribute or namespace information may not be as resource intensive as data filtering (e.g. removing duplicate data segments). Thus, a dedicated (or specialized node) may be assigned as a candidate node to which certain processing operations (e.g. first phase deduplication processing) are delegated. In addition, in some embodiments, the metadata node may be an interface to access portions of a file system namespace. As a result, the metadata node may need to be accessed with respect to all backup files.

Accordingly, in response to a data access 501 (e.g. write backup data operation), the system may initiate a deduplication process. For example, the data access may request that backup data related to backup files F1, F2, and F3 be written. As described, the system may identify Node A as a metadata node and therefore available to perform a workload. Accordingly, the system may redirect a request such that Node A performs a first phase deduplication processing despite not hosting any of the related backup files of the backup data. Thus, Node A may perform the first phase deduplication processing for the backup data related to backup files F1, F2, and F3. In addition, a metadata access 503 may be performed by the system, or Node A specifically, to obtain information from metadata M. For example, the metadata may include information determining whether the backup data is related to backup files (or objects) already stored by the nodes, and if so, which nodes store (or host) such backup files. After directing Node A to perform the first phase deduplication processing, the second phase deduplication processing may be directed (or redirected) to the appreciate node that hosts the related data. Accordingly, as shown in this example, Node B may perform a second phase processing of the backup data related to backup files F1 and F2, and similarly, Node C may perform a second phase processing of the backup data related to backup file F3. As described, the second phase processing performed by Node B and Node C for backup files F1, F2, and F3 respectively, may include writing data (e.g. as a backup file or object) to an associated physical storage array 318. For example, writing data may include creating a second backup file (e.g. backup file F1', F2', or F3').

Figure 7:
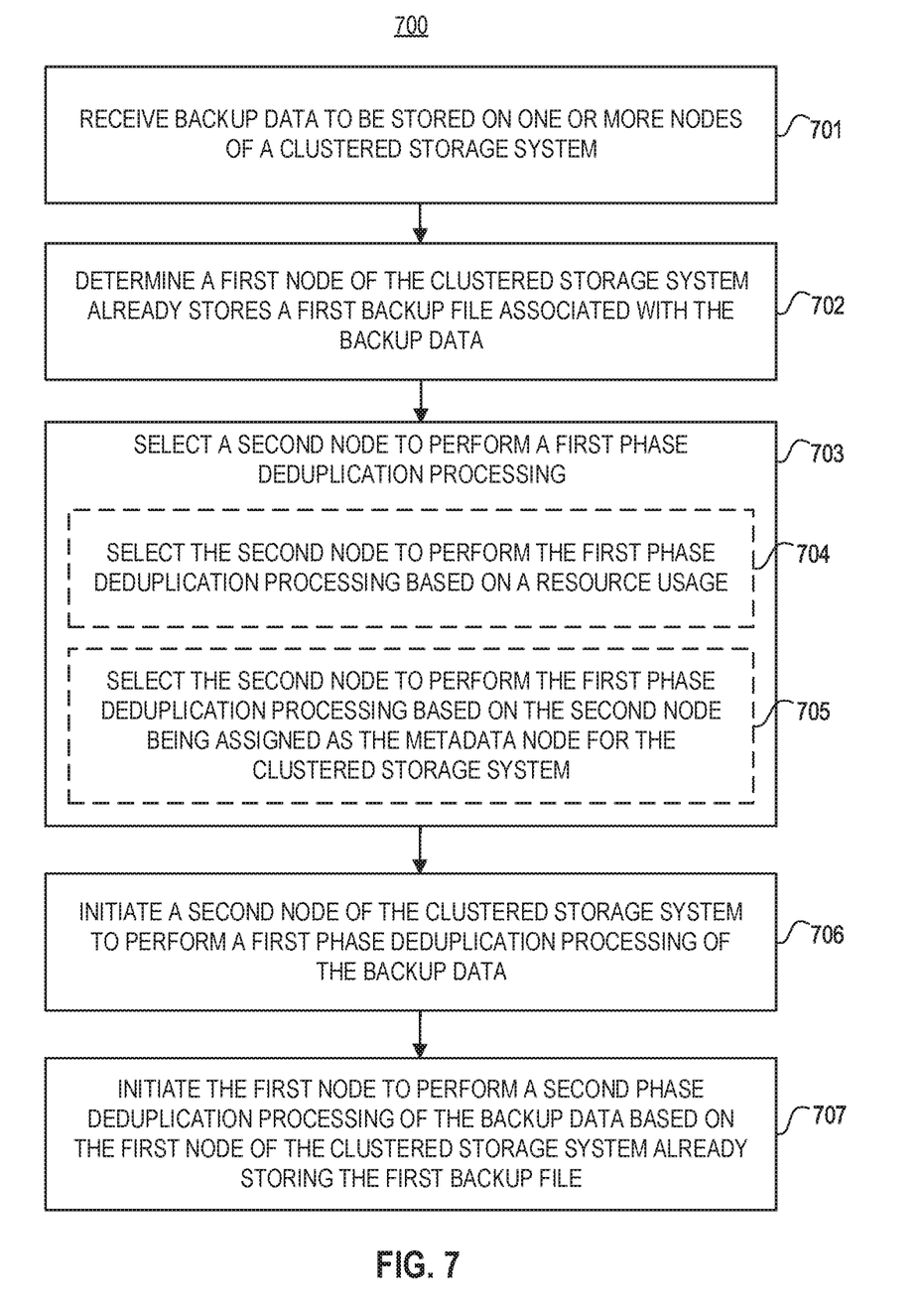
FIG. 7 is a flow diagram illustrating an example method of distributing phases of deduplication processing amongst a set of nodes according to one or more embodiments of the disclosure.

FIG. 7 is a flow diagram illustrating an example method of distributing phases of deduplication processing amongst a set of nodes according to one or more embodiments of the disclosure. Process 700 may use processing logic, which may include software, hardware, or a combination thereof. For example, process 700 may be performed by a system including one or more components described in operating environment 100 (e.g. clustered storage system 180, node 212, etc.).

In 701, the system may receive backup data to be stored on one or more nodes (e.g. nodes 212) of a clustered storage system (e.g. clustered storage system 180). For example, the system may receive backup data, that is associated with a particular client (or customer) or data source (e.g. data sources 411-415), from a backup component (e.g. backup component 150). In some embodiments, the backup data may be received as part of an operation to write a backup file (or objects) to the clustered storage system that is initiated by a backup application.

In 702, the system may determine a first node of the clustered storage system already stores a first backup file associated with the backup data. For example, the system may determine whether a node already stores a previous generation of the received backup data. In one embodiment, determining the first node of the clustered storage system already stores the first backup file may include accessing file system information stored by a dedicated metadata node of the clustered storage system, In one embodiment, determining the first node of the clustered storage system already stores the first backup file may include matching a first data source identifier associated with the first backup file with a second data source identifier provided with the received backup data. In some embodiments, the clustered storage system may traverse an index to determine whether a node already stores data originating from the same data source as a to-be-created backup file. In addition, in some embodiments, the system may traverse data source identifiers that are stored as an attribute on lower layers of the file system that implement a global namespace (e.g. GNS 208).

In 703, the system may select (or identify, assign, determine, etc.) a second node to perform a first phase deduplication processing. As described, depending on the particular implementation, the system may distribute an initial processing workload based on several factors or policies.

In one embodiment, the system may determine a resource usage associated with at least some of the nodes. In such an embodiment, as shown in 704, the system may determine a resource usage associated with at least some of the nodes, and accordingly, select the second node to perform the first phase deduplication processing based on the resource usage. For example, the system may select the second node in response to the second node having the lowest current CPU load. For example, the system may determine the resource usage as part of a load balancing algorithm (or procedure). The resource usage may include CPU usage (or availability), storage usage (or capacity), and other factors related to particular nodes. For example, some nodes may be classified in a particular manner based on having increased capabilities or being better resources than other nodes. Accordingly, certain nodes may have a capability rating, classification, or weighting that is used when selecting a node for a workload as part of a load balancing.

In one embodiment, the system may determine whether particular nodes store certain data required to perform certain operations of a deduplication process. In such an embodiment, as shown in 705, the system may determine the second node is assigned as a metadata node for the clustered storage system, and accordingly, select the second node to perform the first phase deduplication processing based on the second node being assigned as the metadata node for the clustered storage system.

For example, the system may identify a dedicated or specialized node such as a node the stores metadata (or metadata node). For example, the metadata node may store file system information such as file attributes, a namespace hierarchy, or directory information of the backup files stored by the clustered storage system. The metadata node may be highly available (e.g. the CPU utilization may be lower than other nodes), and accordingly, may be available to perform a phase of the deduplication workload.

In addition, in some embodiments, the system may select the second node to perform the first phase deduplication processing based on the second node being associated with a data source of the backup data. For example, certain nodes may be available to certain services or clients, and accordingly, a data source (e.g. data source identifier) may be used to potentially identify such services or clients. Moreover, in some embodiments, the system may select the second node to perform the first phase deduplication processing based on the second node being associated with a client from which the backup data originates. For example, backup data may be associated with a particular client that has access to particular nodes within a clustered storage system. For example, certain IP addresses may be available (or accessible, exposed, etc.) to certain customers that may be mapped to particular nodes (e.g. nodes within a particular subnet).

In 706, as a response to selecting the second node for a workload, the system may initiate the second node of the clustered storage system to perform a first phase deduplication processing of the backup data. In one embodiment, the first phase deduplication processing may include at least computing fingerprints of the backup data. In addition, the first phase deduplication processing may include one or more of anchoring, mapping, compression, or other related operations or sub-processes. As described, the system may distribute a subsequent processing workload to a node that already stores (or hosts) data related to the backup data.

As a result, in 707, the system may initiate the first node to perform, after the first phase deduplication processing, a second phase deduplication processing of the backup data based on the first node of the clustered storage system already storing the first backup file. In one embodiment, the second phase deduplication processing may include at least writing the backup data for storage as a second backup file on the first node. As described, a filtering may be performed as part of a deduplication process, and accordingly, writing the backup data for storage as a second backup file on the first node may include writing only the filtered backup data as the second backup file (if necessary) on the first node. In addition, the second phase deduplication processing may include one or more of filtering, packing, or other related operations or sub-processes.

As noted, the operations (or steps) shown in the above processes are not necessarily performed in the order indicated and may be performed in parallel, as a single operation, or as multiple operations. For example, the system may determine a particular node already stores a backup file associated with the backup data before, concurrently with, or after, initiating the first phase deduplication.

Accordingly, embodiments described herein may provide an efficient technique for distributing multiple phases of a deduplication processing amongst of set of nodes within a clustered storage environment.

Figure 8:
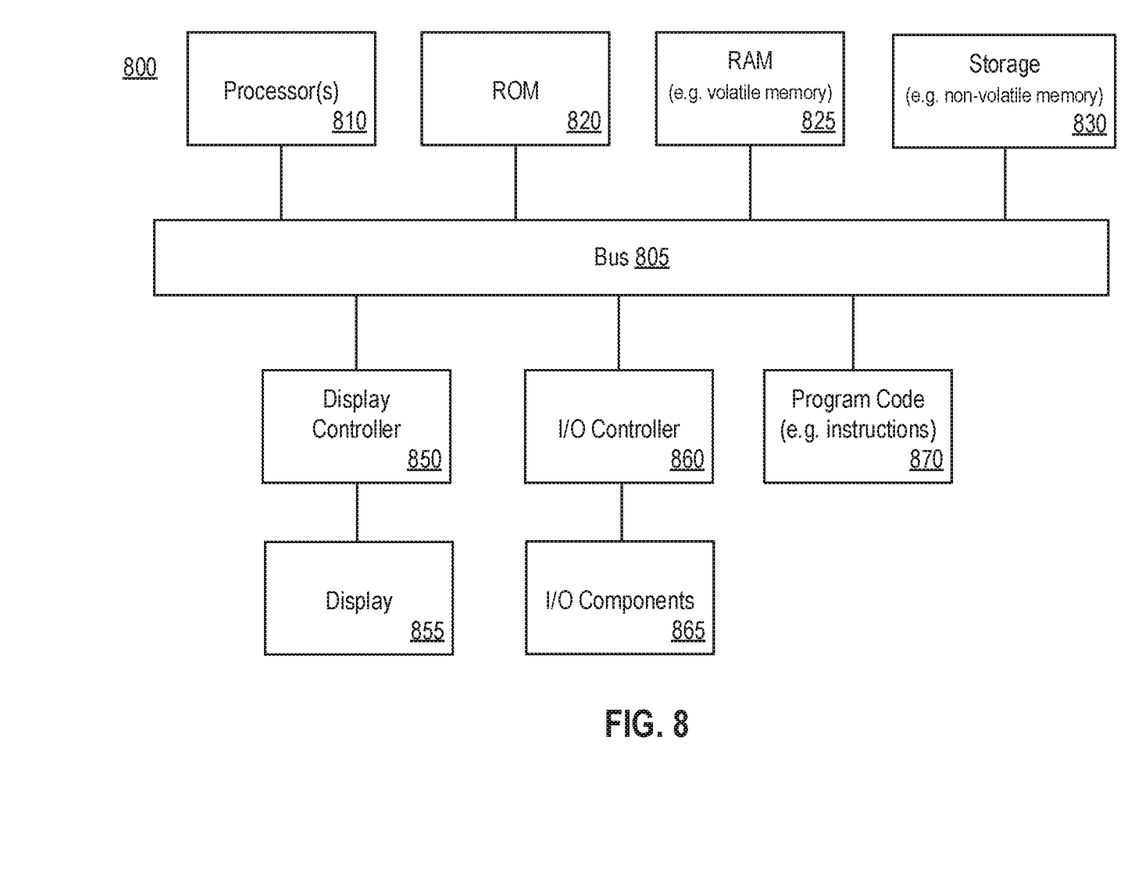
FIG. 8 is a block diagram illustrating an example of a computing system that may be used in conjunction with one or more embodiments of the disclosure.

FIG. 8 shows a block diagram of an example of a computing system that may be used in conjunction with one or more embodiments of the disclosure. For example, computing system 800 (or system, or server, or computing device, or device) may represent any of the devices or systems (e.g. clustered storage system 180, node 212, CWB 206, CSP 210, etc.) described herein that perform any of the processes, operations, or methods of the disclosure. Note that while the computing system 800 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor(s) 810 may retrieve stored instructions from one or more of the memories 820, 825, and 830 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 810 may perform operations in an on-demand or "cloud computing" environment or as a service (e.g. within a "software as a service" (SaaS) implementation). Accordingly, the performance of operations may be distributed among the one or more processors 810, whether residing only within a single machine or deployed across a number of machines. For example, the one or more processors 810 may be located in a single geographic location (e.g. within a home environment, an office environment, or a server farm), or may be distributed across a number of geographic locations. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g. accessible via a network).

A display controller 850 may be coupled to the bus 805 in order to receive display data to be displayed on a display device 855, which can display any one of the user interface features or embodiments described herein and may be a local or a remote display device. The computing system 800 may also include one or more input/output (I/O) components 865 including mice, keyboards, touch screen, network interfaces, printers, speakers, and other devices. Typically, the input/output components 865 are coupled to the system through an input/output controller 860.

Program code 870 may represent any of the instructions, applications, software, libraries, toolkits, modules, components, engines, units, functions, logic, etc. as described herein (e.g. clustered storage system 180, node 212, CWB 206, CSP 210, etc.). Program code 870 may reside, completely or at least partially, within the memories described herein (e.g. non-transitory computer-readable media), or within a processor during execution thereof by the computing system. Program code 870 may include both machine code, such as produced by a compiler, and files containing higher-level or intermediate code that may be executed by a computing system or other data processing apparatus (or machine) using an interpreter. In addition, program code 870 can be implemented as software, firmware, or functional circuitry within the computing system, or as combinations thereof. Program code 870 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive backup data to be stored on one or more nodes of a clustered storage system;
   determine a first node of the clustered storage system already stores a first backup file associated with the received backup data, the first backup file being a previous generation of the received backup data;
   select a second node of the clustered storage system based on a workload balancing factor or a policy associated with the second node;
   initiate the selected second node of the clustered storage system to perform a first phase of a multiple phase deduplication processing of the received backup data the first phase deduplication processing including at least computing fingerprints of the received backup data;
   select, after the first phase deduplication processing of the received backup data, the first node to perform a second phase of the multiple phase deduplication process based on the first node already storing the first backup file associated with the received backup data; and
   initiate the selected first node to perform the second phase of the multiple phase deduplication processing by redirecting the multiple phase deduplication processing to the first node, the second phase deduplication processing including at least writing the backup data for storage as a second backup file on the first node.

2. The system of claim 1, wherein the plurality of instructions, when executed, further cause the one or more processors to:
   determine a resource usage associated with at least some of the nodes; and
   select the second node to perform the first phase deduplication processing based on the resource usage.

3. The system of claim 1, wherein the plurality of instructions, when executed, further cause the one or more processors to:
   determine the second node is assigned as a metadata node for the clustered storage system; and
   select the second node to perform the first phase deduplication processing based on the second node being assigned as the metadata node for the clustered storage system.

4. The system of claim 3, wherein the metadata node stores file system information of the backup files stored by clustered storage system.

5. The system of claim 4, wherein determining the first node of the clustered storage system already stores the first backup file includes accessing the file system information stored by the metadata node.

6. The system of claim 1, wherein determining the first node of the clustered storage system already stores the first backup file includes matching a first data source identifier associated with the first backup file with a second data source identifier provided with the received backup data.

7. The system of claim 1, wherein the second phase deduplication processing further includes filtering the backup data by identifying duplicate data segments already stored by the clustered storage system.

8. The system of claim 1, wherein the plurality of instructions, when executed, further cause the one or more processors to:
   select the second node to perform the first phase deduplication processing based on the second node being associated with a data source of the backup data.

9. A method comprising:
   receiving, by a system, backup data to be stored on one or more nodes of a clustered storage system;
   determining, by the system, a first node of the clustered storage system already stores a first backup file associated with the received backup data, the first backup file being a previous generation of the received backup data;
   selecting, by the system, a second node of the clustered storage system based on a workload balancing factor or policy associated with the second node;
   initiate the selected second node of the clustered storage system to perform a first phase of a multiple phase deduplication processing of the received backup data the first phase deduplication processing including at least computing fingerprints of the received backup data;
   selecting, by the system, after the first phase deduplication processing of the received backup data, the first node to perform a second phase of the multiple phase deduplication process based on the first node already storing the first backup file associated with the received backup data; and
   initiating, by the system, the selected first node to perform the second phase of the multiple phase deduplication processing by redirecting the multiple phase deduplication processing to the first node, the second phase deduplication processing including at least writing the backup data for storage as a second backup file on the first node.

10. The method of claim 9, further comprising:
    determining a resource usage associated with at least some of the nodes; and
    selecting the second node to perform the first phase deduplication processing based on the resource usage.

11. The method of claim 9, further comprising:
    determining the second node is assigned as a metadata node for the clustered storage system; and
    selecting the second node to perform the first phase deduplication processing based on the second node being assigned as the metadata node for the clustered storage system.

12. The method of claim 11, wherein the metadata node stores file system information of the backup files stored by the clustered storage system, and wherein determining the first node of the clustered storage system already stores the first backup file includes accessing the file system information stored by the metadata node.

13. The method of claim 9, wherein determining the first node of the clustered storage system already stores the first backup file includes matching a first data source identifier associated with the first backup file with a second data source identifier provided with the received backup data.

14. The method of claim 9, wherein the second phase deduplication processing further includes filtering the backup data by identifying duplicate data segments already stored by the clustered storage system.

15. A computer program product comprising a non-transitory computer-readable medium having a computer-readable program code embodied therein to be executed by one or more processors, the program code including instructions to:
- receive backup data to be stored on one or more nodes of a clustered storage system;
- determine a first node of the clustered storage system already stores a first backup file associated with the received backup data, the first backup file being a previous generation of the received backup data;
- select a second node of the clustered storage system based on a workload balancing factor or policy associated with the second node;
- initiate the selected second node of the clustered storage system to perform a first phase of a multiple phase deduplication processing of the received backup data the first phase deduplication processing including at least computing fingerprints of the received backup data;
- select, after the first phase deduplication processing of the received backup data, the first node to perform a second phase of the multiple phase deduplication process based on the first node already storing the first backup file associated with the received backup data; and
- initiate the selected first node to perform the second phase of the multiple phase deduplication processing by redirecting the multiple phase deduplication processing to the first node, the second phase deduplication processing including at least writing the backup data for storage as a second backup file on the first node.

16. The computer program product of claim 15, wherein the program code includes further instructions to:
- determine a resource usage associated with at least some of the nodes; and
- select the second node to perform the first phase deduplication processing based on the resource usage.

17. The computer program product of claim 15, wherein the program code includes further instructions to:
- determine the second node is assigned as a metadata node for the clustered storage system; and
- select the second node to perform the first phase deduplication processing based on the second node being assigned as the metadata node for the clustered storage system.

18. The computer program product of claim 17, wherein the metadata node stores file system information of the backup files stored by the clustered storage system, and wherein determining the first node of the clustered storage system already stores the first backup file includes accessing the file system information stored by the metadata node.

19. The computer program product of claim 15, wherein determining the first node of the clustered storage system already stores the first backup file includes matching a first data source identifier associated with the first backup file with a second data source identifier provided with the received backup data.

20. The computer program product of claim 15, wherein the second phase deduplication processing further includes filtering the backup data by identifying duplicate data segments already stored by the clustered storage system.

* * * * *